(12) United States Patent
Mahmudov et al.

(10) Patent No.: US 10,358,355 B2
(45) Date of Patent: Jul. 23, 2019

(54) ALUMINUM HYDROXIDE COAGULANT RECOVERY FROM WATER/WASTEWATER TREATMENT SLUDGE

(71) Applicant: American Air Liquide, Inc., Fremont, CA (US)

(72) Inventors: Rovshan Mahmudov, Newark, DE (US); Sylvester Zuttah, Bear, DE (US)

(73) Assignee: American Air Liquide, Inc., Fremont, CA (US)

( * ) Notice: Subject to any disclaimer, the term of this patent is extended or adjusted under 35 U.S.C. 154(b) by 22 days.

(21) Appl. No.: 15/841,533

(22) Filed: Dec. 14, 2017

(65) Prior Publication Data

US 2019/0185335 A1 Jun. 20, 2019

(51) Int. Cl.
*C01F 7/00* (2006.01)
*C01F 7/46* (2006.01)
(Continued)

(52) U.S. Cl.
CPC ............. *C01F 7/46* (2013.01); *C02F 11/14* (2013.01); *C02F 1/5236* (2013.01); *C02F 2303/04* (2013.01)

(58) Field of Classification Search
CPC .......... C01F 7/46; C02F 11/14; C02F 1/5236; C02F 2303/04
(Continued)

(56) References Cited

U.S. PATENT DOCUMENTS

| 3,959,133 A | 5/1976 | Fulton |
| 4,130,627 A | 12/1978 | Russ et al. |

(Continued)

FOREIGN PATENT DOCUMENTS

| CN | 105948442 | 9/2016 |
| EP | 2 017 225 | 1/2009 |

(Continued)

OTHER PUBLICATIONS

Grabow, W.O. et al. "Role of lime treatment in the removal of bacteria, enteric viruses, and coliphages in a wastewater reclamation plant," Applied and Environmental Microbiology, vol. 35, No. 4, 1978, 663-669.

(Continued)

*Primary Examiner* — Steven J Bos
(74) *Attorney, Agent, or Firm* — Yan Jiang

(57) ABSTRACT

A method for recovery of aluminum hydroxide $Al(OH)_3$ from an aluminum enriched water/wastewater treatment sludge is disclosed. The method includes the steps of: adding a hydrated lime slurry to the aluminum enriched water/wastewater treatment sludge to form an alkaline sludge; adding sodium carbonate $Na_2CO_3$ to the alkaline sludge to form a $Na_2CO_3$ treated sludge; forming a first supernatant from the $Na_2CO_3$ treated sludge of step b) containing $NaAl(OH)_4$; introducing $CO_2$ to the first supernatant to form a precipitate of $Al(OH)_3$ and a second supernatant containing $NaHCO_3$; and recycling at least a portion of the $NaHCO_3$ from the second supernatant back to the alkaline sludge of step a).

20 Claims, 1 Drawing Sheet

(51) Int. Cl.
    *C02F 11/14* (2019.01)
    *C02F 1/52* (2006.01)
(58) Field of Classification Search
    USPC .......................................... 423/127; 210/723
    See application file for complete search history.

(56) References Cited

U.S. PATENT DOCUMENTS

| | | |
|---|---|---|
| 5,304,309 A | 4/1994 | Sengupta |
| 6,495,047 B1 | 12/2002 | SenGupta et al. |
| 2013/0319941 A1 | 12/2013 | Schneider |

FOREIGN PATENT DOCUMENTS

| | | | |
|---|---|---|---|
| EP | 2 452 924 | | 5/2012 |
| JP | 2002 113472 | | 4/2002 |
| KR | 2004 0088093 | | 10/2004 |
| RU | 2133225 | | 7/1999 |
| TW | 201226577 | | 7/2012 |
| WO | WO-2015/128541 | * | 9/2015 |

OTHER PUBLICATIONS

Masschelein, W.J. et al., "The feasibility of coagulant recycling by alkaline reaction of aluminum hydroxide sludges," Water Research, vol. 19, No. 11, 1985, 1363-1368.
Polprasert, C. et al. "The inactivation of faecal coliforms and *Ascaris* ova in faeces by lime," Water Research, vol. 15, No. 11, 1981, 31-36.

* cited by examiner

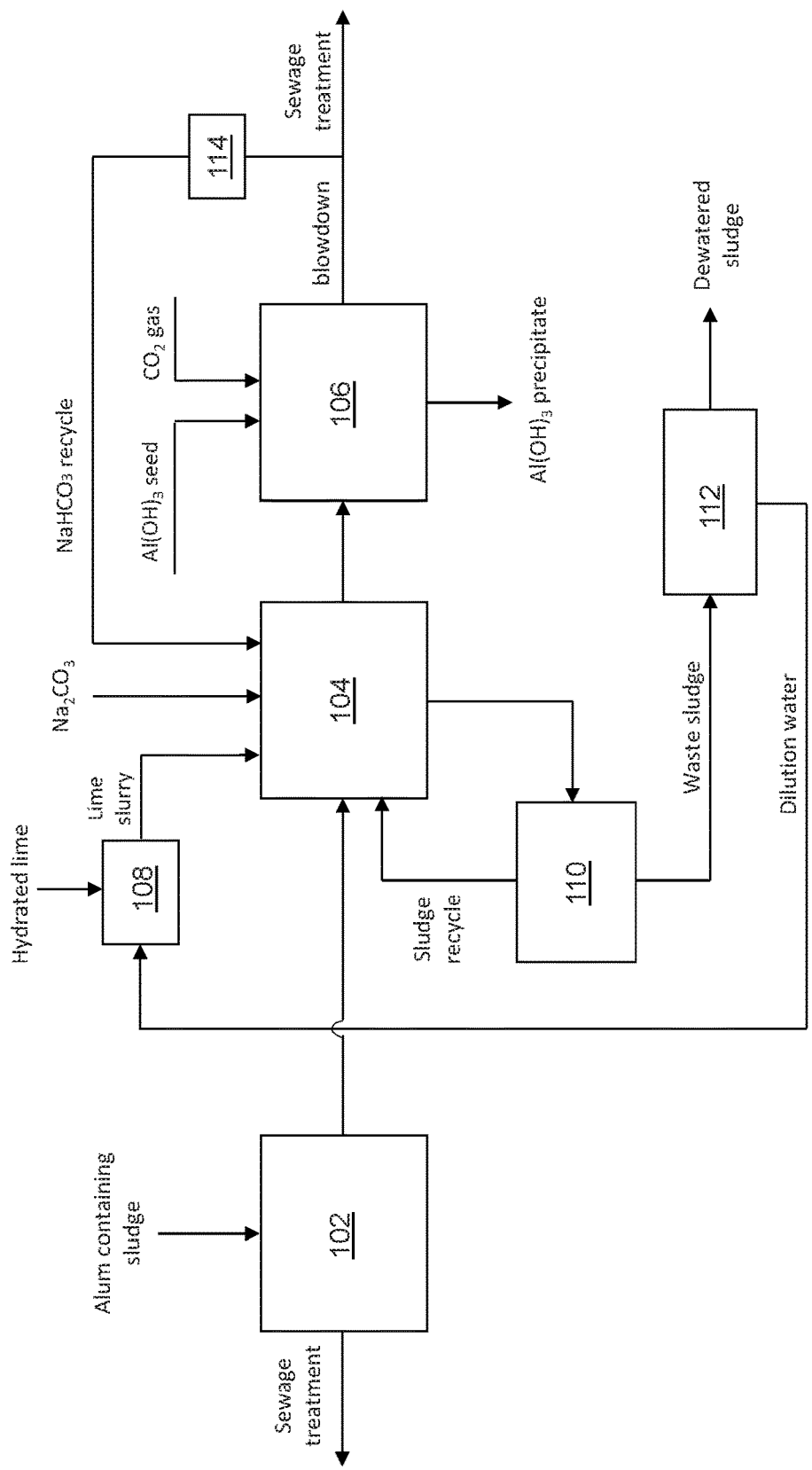

ALUMINUM HYDROXIDE COAGULANT RECOVERY FROM WATER/WASTEWATER TREATMENT SLUDGE

FIELD OF THE INVENTION

The present invention relates to methods and processes for aluminum hydroxide coagulant recovery from aluminum enriched water/wastewater treatment sludge under alkaline conditions, in particular, for recovering aluminum hydroxide from the sludge using hydrated lime $Ca(OH)_2$, sodium carbonate $Na_2CO_3$ and $CO_2$ gas.

BACKGROUND

Aluminum hydroxide (alum) is the most common coagulant used in water and wastewater treatment. The main purpose of alum in these applications is to improve the settling of suspended solids and color removal. Alum is also used to remove phosphate from wastewater treatment effluent. In all these applications, aluminum enriched sludge is generated. Alum in the sludge generated during these processes causes difficulties with sludge dewatering and disposal because alum traps water. Therefore, aluminum recovery from water and wastewater treatment sludge has several significant advantages: (1) improving sludge dewaterability, (2) reducing sludge mass or weight by dewatering the sludge, and (3) cutting down the cost of alum by reusing the recovered alum.

There are limited options for recovery of alum from sludge containing high concentration of $CaCO_3$, $CaSO_4$, and $Mg(OH)_2$. The most widely accepted method for aluminum recovery is acidulation of the sludge. Exemplary examples of aluminum recovery under acidic circumstance include CN105948442, TW201226577, KR20040088093, U.S. Pat. Nos. 5,304,309, 6,495,047, US2013319941, JP2002113472, RU2133225, U.S. Pat. Nos. 4,130,627, 3,959,133, etc.

Attempts have been made to recover aluminum hydroxide under alkaline conditions. For example, EP2017225 to Olsson et al. discloses a process for production of an aluminum hydroxide containing filter cake from aluminum containing waste waters, in which acidic and alkaline waste waters containing aluminum are mixed in a ratio resulting in a pH of 9-11 to obtain mixed waste waters. The mixed waste waters are allowed to react with each other during a retention time of at least 5 hours resulting in an aluminum hydroxide containing slurry, which is dewatered to obtain an aluminum hydroxide containing filter cake.

EP2452924 to Rossi et al. discloses a method for the treatment of waste liquids originating from plants for the treatment of aluminum that includes mixing a first alkaline eluate (B) that contains sodium hydroxide (NaOH) and sodium aluminate ($NaAlO_2$), and a second acid eluate (A) which contains sulfuric acid ($H_2SO_4$) and aluminum sulfate ($Al_2(SO_4)_3$) to achieve the forming of an aluminum hydroxide precipitate ($Al(OH)_3$) on the bottom of a reactor upon reaching a pH value of the content of the reactor between 7.5 and 9.0.

Masschelein et al. (W. J. Masschelein, R. Devleminck and J. Genot, "The Feasibility of Coagulant Recycling by Alkaline Reaction of Aluminum Hydroxide Sludges", Water Research, vol. 19, No. 11, 1985, p 1363-1368) disclose recovery of aluminum from a waterworks sludge by alkalization with NaOH or $Ca(OH)_2$ under laboratory conditions. Even though it was possible to recover 80% of the aluminum the authors recommended recycling less than 50% of the total dosing rate because of impurity problems. Lime was more effective than sodium hydroxide for removing heavy metals from the recovered coagulant.

In addition, cost is also an issue to be considered for aluminum hydroxide coagulant recovery industry.

Thus, a need remains for effective recovery of aluminum hydroxide from wastewater treatment sludge.

SUMMARY

There is disclosed a method for recovery of aluminum hydroxide $Al(OH)_3$ from an aluminum enriched water/wastewater treatment sludge, the method comprising the steps of:
 a) adding a hydrated lime slurry to the aluminum enriched water/wastewater treatment sludge to form an alkaline sludge;
 b) adding sodium carbonate $Na_2CO_3$ to the alkaline sludge to form a $Na_2CO_3$ treated sludge;
 c) forming a supernatant from the $Na_2CO_3$ treated sludge of step b) containing $NaAl(OH)_4$;
 d) introducing $CO_2$ to the supernatant to form a precipitate of $Al(OH)_3$ and a supernatant containing $NaHCO_3$; and
 e) recycling at least a portion of the $NaHCO_3$ from the supernatant back to the alkaline sludge of step a).

In some embodiments the pH of the aluminum enriched water/wastewater treatment sludge is approximately 7.

In some embodiments the pH of the alkaline sludge ranges from approximately 11.5 to 12.

In some embodiments the pH of the supernatant ranges from approximately 6.5 to 7.5.

In some embodiments the pH of the supernatant is approximately 7.

In some embodiments the method further comprises a step of retaining the aluminum enriched water/wastewater treatment sludge for a contact time with the hydrated lime slurry sufficient in length to inactivate at least a portion of bacteria and viruses present in the sludge during the step a) of forming the alkaline sludge.

In some embodiments the contact time is about 2 to 5 hours.

In some embodiments the aluminum enriched water/wastewater treatment sludge contains up to 5% solids.

In some embodiments the solids include aluminum hydroxide.

In some embodiments the method further comprises a step of thickening the aluminum enriched water/wastewater treatment sludge to increase a solid content of the sludge.

In some embodiments the thickened aluminum enriched water/wastewater treatment sludge contains up to 5% solid content.

In some embodiments the solid content in the thickened aluminum enriched water/wastewater treatment sludge includes aluminum hydroxide.

In some embodiments the pH of the thickened aluminum enriched water/wastewater treatment sludge is approximately 7.

In some embodiments the method further comprises the steps of:
 recycling a slurry phase of the alkaline sludge;
 dewatering a waste sludge from the slurry phase to form a dilution water with a high pH value, preferably pH 11.5 or greater; and
 mixing the dilution water with a hydrated lime to form the hydrated lime slurry.

In some embodiments the method further comprises a step of adding $Mg(OH)_2$ to the alkaline sludge to purify the alkaline sludge.

In some embodiments the method further comprises a step of adding $Mg(OH)_2$ to the alkaline sludge in an amount sufficient to coagulate natural organic matter present in the alkaline sludge.

In some embodiments the hydrated lime slurry contains 5-10% $Ca(OH)_2$.

In some embodiments the alkaline sludge contains calcium aluminate $CaAl_2(OH)_8$ according the reaction: $2Al(OH)_3+Ca(OH)_2 \rightarrow CaAl_2(OH)_8$.

In some embodiments $NaAl(OH)_4$ in the supernatant is formed by the following reactions:

$$CaAl_2(OH)_8+Na_2CO_3 \rightarrow 2NaAl(OH)_4+CaCO_3 \qquad a)$$

$$Ca(OH)_2+Na_2CO_3 \rightarrow 2NaOH+CaCO_3 \qquad b)$$

$$2NaOH+CaAl_2(OH)_8 \rightarrow 2NaAl(OH)_4+Ca(OH)_2 \qquad c)$$

In some embodiments $NaHCO_3$ in the supernatant is formed by the following reactions:

$$CO_2+H_2O \rightarrow H_2CO_3^* \qquad a)$$

$$H_2CO_3 \rightarrow H^++HCO_3^- \qquad b)$$

$$HCO_3^- \rightarrow H^++CO_3^{2-} \qquad c)$$

$$NaAl(OH)_4+H_2CO_3^* \rightarrow NaHCO_3+Al(OH)_3(s)+H_2O. \qquad d)$$

In some embodiments $NaHCO_3$ recycled back to the alkaline sludge forms $NaAl(OH)_4$ by the following reactions:

$$Ca(OH)_2+NaHCO_3 \rightarrow NaOH+CaCO_3+H_2O$$

$$2NaOH+CaAl_2(OH)_8 \rightarrow 2NaAl(OH)_4+Ca(OH)_2.$$

BRIEF DESCRIPTION OF THE DRAWINGS

For a further understanding of the nature and objects of the present invention, reference should be made to the following detailed description, taken in conjunction with the accompanying drawings, in which like elements are given the same or analogous reference numbers and wherein:

FIG. 1 is a block flow diagram of an exemplary embodiment of a system for recovery of aluminum hydroxide coagulant from an aluminum enriched water/wastewater treatment sludge.

DESCRIPTION OF PREFERRED EMBODIMENTS

Disclosed are methods and processes for recovery of aluminum hydroxide ($Al(OH)_3$) coagulant from an aluminum enriched water/wastewater treatment sludge under alkaline conditions. More specifically, aluminum hydroxide (or alum) is recovered with hydrated lime slurry ($Ca(OH)_2$), soda ash ($Na_2CO_3$) and carbon dioxide ($CO_2$) gas from the aluminum enriched water/wastewater treatment sludge. In the disclosed method, the alum is converted to aluminate $Al(OH)_4^-$. Aluminum hydroxide is recovered from the alum containing sludge by alkali treatment using a combination of lime and sodium carbonate. Aluminum hydroxide is dissolved in the form of $CaAl_2(OH)_8$ and further $NaAl(OH)_4$. The solubility of other mineral sludge components is low at high pH values. In order to eliminate the carryover of other dissolved species and organic matter, the dissolved species and organic matter are removed by coagulation with $Mg(OH)_2$ without lowering the pH. The dissolved aluminum hydroxide is re-precipitated by lowering the pH using carbon dioxide gas. The liquid phase that is saturated with sodium bicarbonate ($NaHCO_3$) is reused to reduce $Na_2CO_3$ feedstock use for alum recovery.

The disclosed methods for recovery of aluminum hydroxide $Al(OH)_3$ coagulant from the aluminum enriched water/wastewater treatment sludge comprise the steps of:

a) adding a hydrated lime slurry to the aluminum enriched water/wastewater treatment sludge to form an alkaline sludge;

b) adding sodium carbonate $Na_2CO_3$ to the alkaline sludge to form a $Na_2CO_3$ treated sludge;

c) forming a first supernatant from the $Na_2CO_3$ treated sludge of step b) containing $NaAl(OH)_4$;

d) introducing $CO_2$ to the first supernatant to form a precipitate of $Al(OH)_3$ and a second supernatant containing $NaHCO_3$ (preferably saturated); and e) recycling at least a portion of the $NaHCO_3$ from the second supernatant back to the alkaline sludge of step a) to lower $Na_2CO_3$ feedstock consumption by the method FIG. 1 is a block flow diagram of an exemplary embodiment of a system for recovery of aluminum hydroxide coagulant from an aluminum enriched water/wastewater treatment sludge. As shown, the aluminum enriched water/wastewater treatment sludge, which usually contains less than 1% solids and has a pH of about 7, is fed to a sludge thickener 102 to increase its solid content. Here, the solid content may have an aluminum content including aluminum hydroxide or alum. The sludge may be thickened to increase its solid content up to 5%. If the solid content in the sludge is initially in a range of 4-5%, the thickening step may be bypassed. The thickened sludge also generally has a pH of approximately 7. Excess liquid or water after thickening the sludge may be sent to a sewage treatment plant for further purification. The sludge thickener 102 may be a mixing tank having an inlet for adding the aluminum enriched wastewater treatment sludge in, a first outlet for sending the excess liquid or water out to the sewage treatment plant and a second outlet for delivering the thickened sludge out to an aluminum recovery reactor 104 for aluminum recovery.

The aluminum recovery reactor 104 may be a reactor tank or a clarifier. A hydrated lime slurry from a container 108 is pumped to the aluminum recovery reactor 104 where the pH of the thickened sludge is raised, thereby forming an alkaline sludge. The solubility of aluminum hydroxide $Al(OH)_3$ increases with increasing pH. The hydrated lime slurry, preferably 5-10% calcium hydroxide $Ca(OH)_2$ slurry, is used to raise the pH of the thickened sludge to approximately 11.5-12. Under this circumstance, aluminum hydroxide $Al(OH)_3$ is dissolved in the form of aluminate ($Al(OH)_4^-$) in the alkaline sludge. The solubility of aluminate, however, is limited by the presence of calcium ions that form calcium aluminate $CaAl_2(OH)_8$. Thus, the hydrated lime slurry, calcium hydroxide $Ca(OH)_2$, may react with some portion of aluminum hydroxide $Al(OH)_3$ in the thickened sludge forming calcium aluminate $CaAl_2(OH)_8$, according to the equation (I)

$$2Al(OH)_3+Ca(OH)_2 \rightarrow CaAl_2(OH)_8 \qquad (I)$$

Raising the pH of the thickened sludge may also effectively disinfect the thickened sludge. Given a sufficient contact time between the thickened sludge and the hydrated lime slurry, preferably 2 to 5 hours, some or most bacteria and viruses in both liquid and solid phases of the thickened sludge may be completely inactivated. Thus, an additional sludge disinfection treatment process may be unnecessary, which results in cost-saving.

Calcium aluminate $CaAl_2(OH)_8$ has relatively low solubility that limits the alum recovery efficiency. In order to lower calcium concentration, a sufficient quantity of soda ash or sodium carbonate, $Na_2CO_3$, is added to the aluminum recovery reactor 104 to precipitate calcium as a thermodynamically stable product, calcium carbonate $CaCO_3$. Upon the addition of the soda ash $Na_2CO_3$, calcium aluminate $CaAl_2(OH)_8$ is converted to sodium aluminate $NaAl(OH)_4$ and calcium precipitates out from the alkaline sludge as calcium carbonate $CaCO_3$. The soda ash or sodium carbonate $Na_2CO_3$ may be added in excess and reacts with undissolved calcium hydroxide $Ca(OH)_2$ in the slurry phase to generate sodium hydroxide NaOH and calcium carbonate $CaCO_3$. The generated sodium hydroxide NaOH increases calcium aluminate $CaAl_2(OH)_8$ reaction. Thus, upon the addition of the soda ash $Na_2CO_3$ in the aluminum recovery reactor 104, most $Al(OH)_3$ is converted to sodium aluminate $NaAl(OH)_4$ which has much higher solubility than calcium aluminate $CaAl_2(OH)_8$. Sodium aluminate $NaAl(OH)_4$ is formed in the aluminum recovery reactor 104 through the following reactions given in Equations (II)-(IV):

$$CaAl_2(OH)_8 + Na_2CO_3 \rightarrow 2NaAl(OH)_4 + CaCO_3(\text{solid}) \quad (II)$$

$$Ca(OH)_2 + Na_2CO_3 \rightarrow 2NaOH + CaCO_3(\text{solid}) \quad (III)$$

$$2NaOH + CaAl_2(OH)_8 \rightarrow 2NaAl(OH)_4 + Ca(OH)_2 \quad (IV)$$

The alkaline sludge in the aluminum recovery reactor 104 now contains a liquid phase with sodium aluminate $NaAl(OH)_4$ and a solid phase or a settled sludge phase with a precipitated calcium content. The solid phase or the settled sludge of the alkaline sludge formed herein may still contain some of alum. Thus, the settled sludge from the aluminum recovery reactor 104 may be fed to a sludge storage tank 110 and recycled back to the aluminum recovery reactor 104 to maximize aluminum recovery.

During alum extraction in the alkaline sludge it is possible that other constituents of the sludge are also solubilized. However, most of these elements have very low solubility in a pH ranging from 11.5 to 12 compared to aluminum hydroxide $Al(OH)_3$. For aluminum recovery from sludge having high portion of organic substances presented in the alkaline sludge, some of the organic substances may dissolve into the liquid phase of the sludge at high pH values (e.g., around 11.5 to 12 herein). However, calcium carbonate $CaCO_3$ precipitate is known to induce sweep coagulation by entrapping dissolved and suspended organics. Therefore, the concentration of organic substances is generally low in the alkaline sludge. In case the organic substances are not removed, $Mg(OH)_2$ may be added to the alkaline sludge for high pH coagulation to remove the organic substances in the liquid phase.

The liquid phase or the supernatant of the alkaline sludge from the aluminum recovery reactor 104 now predominantly consists of $NaAlOH_4$ and has a high pH value of about 11.5 to 12. The supernatant from the aluminum recovery reactor 104 is forwarded to a $CO_2$ contact reactor 106 where $CO_2$ gas is added to adjust the pH of the supernatant down to a range of 6.5-7.5, preferably approximately 7. The supernatant from the aluminum recovery reactor 104 may be pumped to the $CO_2$ contact reactor 106, or may be fed into the $CO_2$ contact reactor 106 by gravity depending on the design of the aluminum recovery reactor 104 and the $CO_2$ contact reactor 106. The $CO_2$ in the $CO_2$ contact reactor 106 is first converted to very weak carbonic acid $H_2CO_3$ in the supernatant. The very weak carbonic acid $H_2CO_3$ further dissociates in water into bicarbonate $HCO_3^-$ or carbonate $CO_3^{2-}$ depending on the solution pH following the reactions given in Equations (V)-(VII):

$$CO_2 + H_2O \rightarrow H_2CO_3^* \quad (V)$$

$$H_2CO_3^* \rightarrow H^+ + HCO_3^- \quad (VI)$$

$$HCO_3^- \rightarrow H^+ + CO_3^{2-} \quad (VII)$$

The acidity constant for the reaction (V) is $10^{-6.3}$. Therefore, in the pH range 6.5-7.5, bicarbonate $HCO_3^-$ will be the dominating species. Sodium aluminate $NaAlOH_4$ in the supernatant is then converted to sodium bicarbonate $NaHCO_3$ following the reaction given in Equation (VIII):

$$NaAl(OH)_4 + H_2CO_3^* \rightarrow NaHCO_3 + Al(OH)_3(\text{solid}) + H_2O \quad (VIII)$$

Here, $H_2CO_3^*$ denotes the sum of $CO_2$ and $H_2CO_3$. $CO_2$ and $H_2CO_3$ are different species, but are not distinguishable in water. Thus, by adding $CO_2$ gas to the supernatant in the $CO_2$ contact reactor 106, the pH of the supernatant is lowered to around 7±0.5, preferably around 7. At this pH value, aluminum hydroxide $Al(OH)_3$ or gibbsite is almost completely insoluble and precipitates out of the liquid as aluminum hydroxide $Al(OH)_3$ solid. To improve the precipitating process, some of the precipitated gibbsite may be recycled back to the $CO_2$ contact reactor 106 for use as nucleating seeds to produce large solids of gibbsite. The precipitated gibbsite has very low concentration of impurities and may be used as coagulant in water and wastewater treatment facilities. In case of contaminants buildup rendering the precipitated gibbsite or recovered alum unusable for drinking water applications, the recovered alum may be used in municipal and industrial wastewater treatment applications.

Upon the addition of $CO_2$ in the $CO_2$ contact reactor 106, the liquid phase from the $CO_2$ contact reactor 106 is primarily composed of sodium bicarbonate ($NaHCO_3$) and after alum precipitation the supernatant from the $CO_2$ contact reactor 106 becomes saturated with sodium bicarbonate $NaHCO_3$. Furthermore, since the acidity constant for the reaction (V) is about $10^{-6.3}$, in a pH ranging from 6.5 to 7.5, sodium bicarbonate $NaHCO_3$ will be the dominating species in the saturated supernatant.

The system shown in FIG. 1 may operate in a continuous flow mode, in which the alum containing sludge and the hydrated lime slurry are continuously fed into the sludge thickener 102 and the aluminum recovery reactor 104, respectively, and an excess water or liquid blowdown stream from the $CO_2$ contact reactor 106 is continuously pumped out to maintain constant liquid and solid volumes in the sludge thickener 102, the aluminum recovery reactor 104 and the $CO_2$ contact reactor 106, respectively.

The sodium bicarbonate $NaHCO_3$ produced in the $CO_2$ contact reactor 106 may be recycled back to the aluminum recovery reactor 104 by a pump 114 for aluminum solubilization to minimize the use of fresh soda ash feedstock, thereby resulting in additional cost-saving. The pump 114 may be a centrifuge type water pump. The excess water or liquid blowdown stream pumped out from the $CO_2$ contact reactor 106 may be split into two streams. One stream is sent out to a sewage treatment plant for further purification; the other one forms $NaHCO_3$ recycle stream going back to the aluminum recovery reactor 104. The produced sodium bicarbonate $NaHCO_3$ reacts with $Ca(OH)_2$ in the aluminum recovery reactor 104 to form NaOH that reacts with $CaAl_2(OH)_8$ to form $NaAl(OH)_4$, thereby lowering sodium carbonate $Na_2CO_3$ feedstock consumption in the process. The reaction of $NaHCO_3$ reacts with $Ca(OH)_2$ is given in the following Equation (IX):

$$Ca(OH)_2+NaHCO_3 \rightarrow NaOH+CaCO_3+H_2O \quad (IX)$$

$NaAl(OH)_4$ is then produced by Equation (IV).

The liquid phase of the alkaline sludge formed in the aluminum recovery reactor 104 contains $NaAl(OH)_4$ and the solid phase or slurry phase of the alkaline sludge contains a relatively low concentration of aluminum. The slurry phase from the aluminum recovery reactor 104 may be pumped to a sludge storage tank 110 and recycled back to the aluminum recovery reactor 104 for maximizing aluminum recovery. A waste sludge with less to no concentration of aluminum after recycling from the sludge storage tank 110 may be pumped to a filter press 112 for dewatering and disposal. Water from the filter press 112 having a high pH value, for example, a pH value ranging from 11.5 to 12, may be pumped back to the container 108 for reuse as a composition for the hydrated lime slurry preparation and the solid, dewatered sludge, from the filter press 112 may be sent out for disposal.

Several water or liquid pumps (not shown) are used to wherever needed to move sludge or liquids within the system, for example, between the sludge thickener 102 and the aluminum recovery reactor 104, between the aluminum recovery reactor 104 and the sludge storage tank 110, etc. One of ordinary skill in the art will recognize that the water or liquid pumps used herein including, but are not limited to, centrifuge type water pumps.

The disclosed methods for recovery aluminum hydroxide show aluminum hydroxide may be recovered under alkaline conditions. Unlike the widely accepted acidulation method for recovery aluminum from the wastewater treatment sludge, the use of hydrated lime or calcium hydroxide $Ca(OH)_2$ and soda ash or sodium carbonate $Na_2CO_3$ in the aluminum recovery reactor 104 and the use of $CO_2$ gas in the $CO_2$ contact reactor 106, instead of mineral acids such as sulfuric or hydrochloric acid, have flowing advantages.

First, as described in EP2452924 to Rossi et al., sodium hydroxide is efficient to form an alkaline sludge (or eluate), but sodium hydroxide has a relatively high cost. Lime is less expensive, however, using lime instead of sodium hydroxide for alum recovery has not been successful due to the limited solubility of calcium aluminate $CaAl_2(OH)_8$. In the disclosed methods, adding soda ash or $Na_2CO_3$ allows $CaAl_2(OH)_8$ being converted to soluble $NaAl(OH)_4$. Thus, the disclosed methods overcome the problem of $CaAl_2(OH)_8$, enabling the use of less expensive soda ash to thereby create cost-saving.

Second, $CO_2$ allows recovering $NaHCO_3$ for reuse in the aluminum recovery reactor 104 without buildup of sulfate or chloride.

In addition, some of the natural organic matter (NOM) and portion of some mineral elements, such as iron, copper, chromium, and manganese, which were precipitated in the coagulation process, may also solubilize when the pH of the sludge is raised with hydrated lime for alum recovery. Even though the concentration of these impurities may be low compared to recovered aluminum concentration, their concentration will increase with each recycle of sludge from the sludge storage tank 110 and sodium bicarbonate solution from the $CO_2$ contact reactor 106. These dissolved impurities may carry over to the $CO_2$ contact reactor 106 and precipitate along with aluminum hydroxide. However, hydrated lime used in the disclosed methods as the main media for raising the pH for alum recovery in the presence of carbonate alkalinity yields $CaCO_3$ which is known to aid the precipitation of large particles by inducing sweep coagulation. To minimize the carryover of dissolved impurities to the $CO_2$ contact reactor 106, $Mg(OH)_2$ may be added to the aluminum recovery reactor 104. Mg $(OH)_2$ has been shown to have good coagulation effect at high pH values. Unless additional steps are taken to precipitate these impurities, the applicability of the recovered alum for drinking water applications might be limited, but the recovered alum may be used in wastewater clarification or for phosphate removal from wastewater treatment plant effluent.

Another advantage of the disclosed methods for high pH aluminum recovery is sludge disinfection. At pH values above 11.2 in the aluminum recovery reactor 104 a complete inactivation of most if not all relevant waste water pathogens are achieved (see Grabow et al. "Role of Lime Treatment in the Removal of Bacteria, Enteric Viruses, and Coliphages in a Wastewater Reclamation Plant", *Applied and Environmental Microbiology* 35.4, 663-9, 1978; and Polprasert et al. "The Inactivation of Faecal Coliforms and Ascaris Ova in Faeces by Lime", *Water research* 15.1, 31-6, 1981). Therefore, an advantage of the methods described herein includes in some embodiments the elimination of otherwise required sludge or liquid disinfection processes, thus creating additional cost-saving.

Reference herein to "one embodiment" or "an embodiment" means that a particular feature, structure, or characteristic described in connection with the embodiment may be included in at least one embodiment of the invention. The appearances of the phrase "in one embodiment" in various places in the specification are not necessarily all referring to the same embodiment, nor are separate or alternative embodiments necessarily mutually exclusive of other embodiments. The same applies to the term "implementation."

As used in this application, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion.

Additionally, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

The singular forms "a", "an" and "the" include plural referents, unless the context clearly dictates otherwise.

"About" or "around" or "approximately" in the text or in a claim means±10% of the value stated.

"Comprising" in a claim is an open transitional term which means the subsequently identified claim elements are a nonexclusive listing i.e. anything else may be additionally included and remain within the scope of "comprising." "Comprising" is defined herein as necessarily encompassing the more limited transitional terms "consisting essentially of" and "consisting of"; "comprising" may therefore be replaced by "consisting essentially of" or "consisting of" and remain within the expressly defined scope of "comprising".

Ranges may be expressed herein as from about one particular value, and/or to about another particular value. When such a range is expressed, it is to be understood that another embodiment is from the one particular value and/or to the other particular value, along with all combinations within said range.

It will be understood that many additional changes in the details, materials, steps, and arrangement of parts, which have been herein described and illustrated in order to explain the nature of the invention, may be made by those skilled in the art within the principle and scope of the invention as expressed in the appended claims. Thus, the present invention is not intended to be limited to the specific embodiments in the examples given above and/or the attached drawings.

We claim:

1. A method for recovery of aluminum hydroxide $Al(OH)_3$ coagulant from an aluminum enriched water/wastewater treatment sludge, the method comprising the steps of:
   a) adding a hydrated lime slurry to the aluminum enriched water/wastewater treatment sludge to form an alkaline sludge;
   b) adding sodium carbonate $Na_2CO_3$ to the alkaline sludge to form a $Na_2CO_3$ treated sludge;
   c) forming a first supernatant from the $Na_2CO_3$ treated sludge of step b) containing $NaAl(OH)_4$;
   d) introducing $CO_2$ to the first supernatant to form a precipitate of $Al(OH)_3$ and a second supernatant containing $NaHCO_3$; and
   e) recycling at least a portion of the $NaHCO_3$ from the second supernatant back to the alkaline sludge of step a).

2. The method of claim 1, wherein the pH of the aluminum enriched water/wastewater treatment sludge is approximately 7.

3. The method of claim 1, wherein the pH of the alkaline sludge ranges from approximately 11.5 to 12.

4. The method of claim 1, wherein the pH of the second supernatant ranges from approximately 6.5 to 7.5.

5. The method of claim 1, wherein the pH of the second supernatant is approximately 7.

6. The method of claim 1, further comprising the step of:
   a1) retaining the aluminum enriched water/wastewater treatment sludge for a contact time with the hydrated lime slurry sufficient in length to inactivate at least a portion of bacteria and viruses present in the aluminum enriched water/wastewater treatment sludge during the step a) of forming the alkaline sludge.

7. The method of claim 6, wherein the contact time is about 2 to 5 hours.

8. The method of claim 1, wherein the aluminum enriched water/wastewater treatment sludge contains up to 5% solids.

9. The method of claim 8, wherein the solids include aluminum hydroxide.

10. The method of claim 1, further comprising the step of thickening the aluminum enriched water/wastewater treatment sludge to increase a solid content of the sludge.

11. The method of claim 10, wherein the thickened aluminum enriched water/wastewater treatment sludge contains up to 5% solid content.

12. The method of claim 11, wherein the solid content in the thickened aluminum enriched water/wastewater treatment sludge includes aluminum hydroxide.

13. The method of claim 12, wherein the pH of the thickened aluminum enriched water/wastewater treatment sludge is approximately 7.

14. The method of claim 1, further comprising the steps of:
   recycling a slurry phase of the alkaline sludge;
   dewatering a waste sludge from the slurry phase to form a dilution water with a pH value of 11.5 or greater; and
   mixing the dilution water with a hydrated lime to form the hydrated lime slurry.

15. The method of claim 1, further comprising the step of adding $Mg(OH)_2$ to the alkaline sludge in an amount sufficient to coagulate natural organic matter present in the alkaline sludge.

16. The method of claim 1, wherein the hydrated lime slurry contains 5-10% $Ca(OH)_2$.

17. The method of claim 1, wherein the alkaline sludge contains calcium aluminate $CaAl_2(OH)_8$ according to the reaction: $2Al(OH)_3 + Ca(OH)_2 \rightarrow CaAl_2(OH)_8$.

18. The method of claim 17, wherein $NaAl(OH)_4$ in the first supernatant is formed by the following reactions:

$$CaAl_2(OH)_8 + Na_2CO_3 \rightarrow 2NaAl(OH)_4 + CaCO_3$$

$$Ca(OH)_2 + Na_2CO_3 \rightarrow 2NaOH + CaCO_3$$

$$2NaOH + CaAl_2(OH)_8 \rightarrow 2NaAl(OH)_4 + Ca(OH)_2.$$

19. The method of claim 18, wherein $NaHCO_3$ in the second supernatant is formed by the following reactions:

$$CO_2 + H_2O \rightarrow H_2CO_3*$$

$$H_2CO_3* \rightarrow H^+ + HCO_3^-$$

$$HCO_3^- \rightarrow H^+ + CO_3^{2-}$$

$$NaAl(OH)_4 + H_2CO_3* \rightarrow NaHCO_3 + Al(OH)_3(s) + H_2O,$$

wherein $H_2CO_3*$ denotes the sum of $CO_2$ and $H_2CO_3$ present in the second supernatant.

20. The method of claim 17, wherein $NaHCO_3$ recycled back to the alkaline sludge forms $NaAl(OH)_4$ by the following reactions:

$$Ca(OH)_2 + NaHCO_3 \rightarrow NaOH + CaCO_3 + H_2O$$

$$2NaOH + CaAl_2(OH)_8 \rightarrow 2NaAl(OH)_4 + Ca(OH)_2.$$

* * * * *